United States Patent [19]
Arold et al.

[11] Patent Number: 5,050,487
[45] Date of Patent: Sep. 24, 1991

[54] HEATING/AIR CONDITIONING SYSTEM FOR A MOTOR VEHICLE WITH ABSORPTION FILTER

[75] Inventors: Klaus Arold; Heinz Koukal, both of Sindelfingen; Hans Trube, Herrenberg; Karlheinz Witzel, Stuttgart; Wolfgang Volz, Magstadt, all of Fed. Rep. of Germany

[73] Assignee: Daimler-Benz AG, Fed. Rep. of Germany

[21] Appl. No.: 433,122

[22] Filed: Nov. 8, 1989

[30] Foreign Application Priority Data

Nov. 9, 1988 [DE] Fed. Rep. of Germany ....... 3837967

[51] Int. Cl.[5] .............................................. B60H 3/06

[52] U.S. Cl. ...................................... 98/2.11; 55/312; 55/314; 55/502; 165/119

[58] Field of Search .................. 98/2.11; 55/502, 312, 55/314; 165/119, 42, 43

[56] References Cited

U.S. PATENT DOCUMENTS

| | | | |
|---|---|---|---|
| 3,791,113 | 2/1974 | Elder | 55/502 |
| 3,880,625 | 4/1975 | Shook | 55/502 |
| 4,371,386 | 2/1983 | DeVecchi | 55/502 |
| 4,684,381 | 8/1987 | Wasylyniuk | 98/2.11 |
| 4,726,823 | 2/1988 | Brice | 55/502 |
| 4,743,279 | 5/1988 | Kvist et al. | 98/2.11 |
| 4,765,230 | 8/1988 | Soethout et al. | 98/2.11 |
| 4,765,810 | 8/1988 | Wetzel | 55/502 |
| 4,793,838 | 12/1988 | Thorne | 55/502 |
| 4,805,257 | 2/1989 | Johansson et al. | 55/502 |

FOREIGN PATENT DOCUMENTS

| | | | |
|---|---|---|---|
| 3700338 | 7/1987 | Fed. Rep. of Germany . | |
| 0101814 | 6/1983 | Japan | 98/2.11 |

*Primary Examiner*—John K. Ford
*Attorney, Agent, or Firm*—Evenson, Wands, Edwards, Lenahan & McKeown

[57] ABSTRACT

In a heating/air conditioning system for a motor vehicle, with an exchangeable and selectively bypassable absorption filter which is arranged in a channel shaped housing and through which fresh air and/or circulating air can flow, a high degree of absorption is achieved when unprocessed air passing through internal leakage points at the absorption filter holder and the shut off bypass line of the absorption filter is collected and conveyed, via at least one line, to a location which is separated from the passenger space and the pressure level of which is lower than the pressure level on the flow off side of the absorption filter. Untreated air, which in certain circumstances escapes through external leakage points of a housing partition, is guided outside the passenger space, at the same time being prevented from overflowing into the latter.

10 Claims, 1 Drawing Sheet

HEATING/AIR CONDITIONING SYSTEM FOR A MOTOR VEHICLE WITH ABSORPTION FILTER

BACKGROUND AND SUMMARY OF THE INVENTION

The present invention generally relates to a heating or air conditioning system for a motor vehicle, with an exchangeable and selectively bypassable absorption filter which is arranged in a channel shaped housing and through which fresh air and/or circulating air can flow, and more particularly to an arrangement for preventing a processing result from being imparted despite the occurrance of untreated leakage air.

An arrangement of this type is disclosed by German, Published, Unexamined Patent Application 3,700,338. In the absorption mode of this arrangement it has become apparent that even very small quantities of untreated air, which enter the passenger space via leakage points by bypassing the absorption filter, impair the purification result to a greater or lesser extend according to a particular person's reaction.

Thus, an object of the present invention is to provide a heating/air conditioning system for preventing a processing result from being impaired in any way, despite the occurrence of untreated leakage air.

In a preferred exemplary embodiment of the invention, which is simple in terms of construction, leakage air is collected in a region of an absorption filter holder and a shut off bypass line by at least one continuous lip gasket which is secured on a bearing side of the absorption filter and on a pivoting flap of the bypass line. The lip gasket, with the respective associated bearing surface, forms a hollow chamber. This hollow chamber can easily be tapped, and the leakage air can be eliminated in a simple way.

To ensure that the hollow chamber continues to perform its function even at higher applied pressures, the lip gasket is stiffened on the fastening side by means of ribs transverse relative to its direction of extension according to one embodiment of the invention.

Simple conveyance of tapped air is obtained if the hollow chambers are connected to one another. A single tapping of one hollow chamber at an especially suitably sited location is then sufficient.

In the region of the absorption filter holder, the leakage air can also be collected in a cavity which is limited by two continuous gaskets bracing the absorption filter relative to a absorption filter holder on the inflow and flow off sides.

If a housing partition is located on that side of the dashboard facing away from the passenger space, according to a further embodiment of the invention, there is no need for a collection and controlled elimination of the leakage air possibly occurring along the housing partition when the absorption filter is subjected to pressure.

If a blower is placed in front of the channel-shaped housing, a cowl covering the housing partition and the blower can be secured to the dashboard, thereby forming a location which is closed off, with the exception of a closable air inflow port, and has a pressure level low when the blower is in operation and into which a bleed off line opens. There is therefore no need for a separate source at a low pressure level for removing the quantity of internal leakage air by suction.

However, it is also possible for the separated location, into which the bleed off line opens, to be formed by a vacuum source, such as, for example, the suction pipe, assigned to an internal combustion engine.

Other objects, advantages and novel features of the present invention will become apparent from the following detailed description of the invention when considered in conjunction with the accompanying drawings.

DETAILED DESCRIPTION OF THE DRAWINGS

Figures 1, 2, 3:
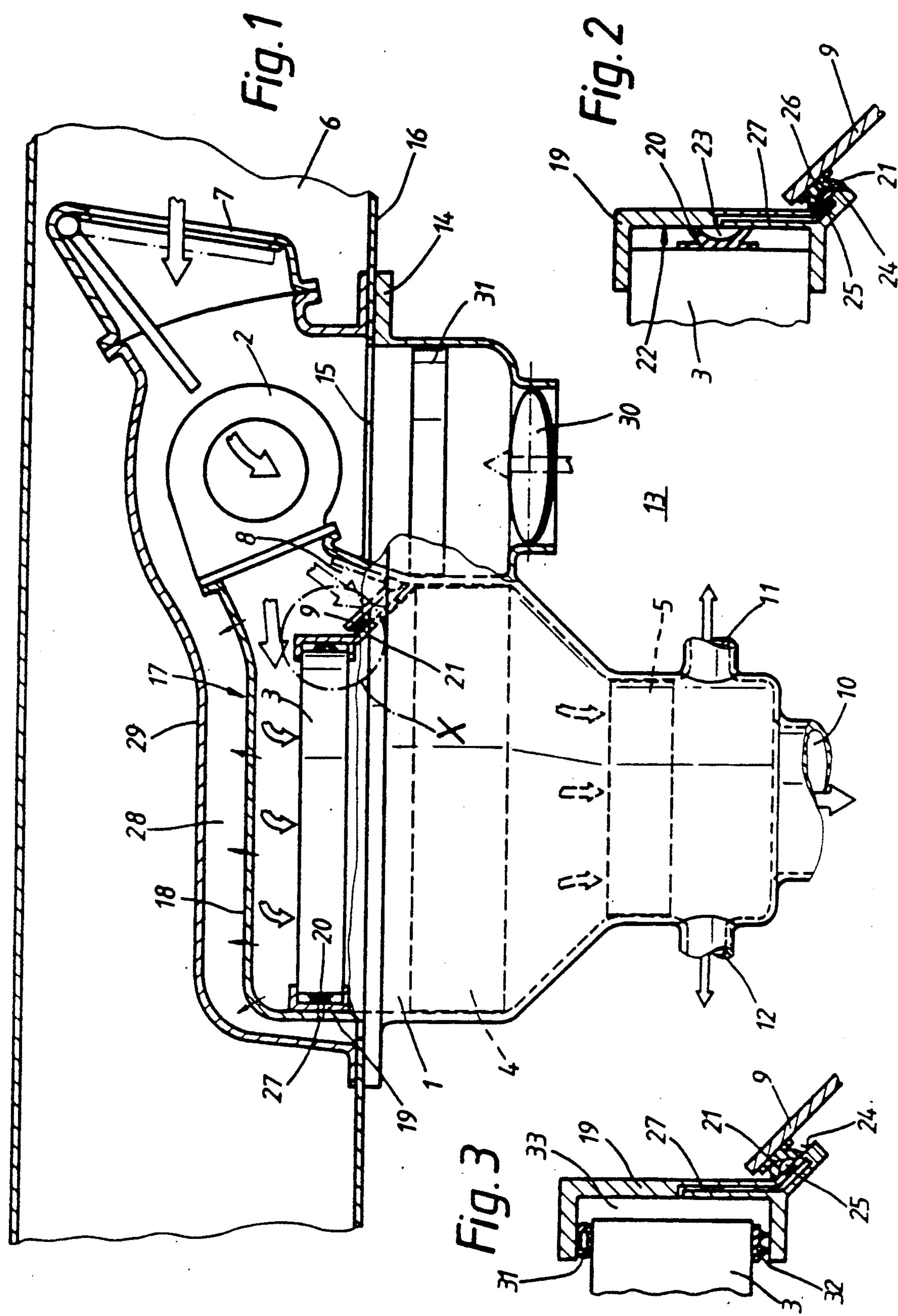
FIG. 1 shows an air conditioning system secured to the dashboard of a motor vehicle and having air processing in accordance with one embodiment of the present invention.
FIG. 2 shows the area designated at "x" in FIG. 1 on a larger scale.
FIG. 3 shows a representation corresponding to that of FIG. 2, with another filter gasket according to a further embodiment of the invention.

The subject of the invention is explained in detail below by means of exemplary embodiments illustrated in the drawings.

A housing 1, which belongs to an air conditioning system, not shown in detail, in a motor vehicle and to which a free suction blower 2 is flanged, receives an absorption filter 3, an evaporator 4 and a heat exchanger 5. As indicated by arrows represented by unbroken lines, fresh air flows from an equipment space 6 through a closable fresh air inflow 7 to the blower 2 and then flows off in the direction of the absorption filter 3. In clean air regions, a pivoting flap 9, arranged in a bypass line 8, can be opened, so that the conveyed air, bypassing the absorption filter 3, flows directly to the evaporator 4 and heat exchanger 5. The air then divides and, via outlets 10, 11 and 12 with following ducts (not shown), flows to predetermined outflow ports in a passenger space 13.

The housing 1 is equipped with a continuous flange 14 which is secured to a dashboard 16 possessing a passage orifice 15. The absorption filter 3 and the blower 2 pass through the passage orifice 15. So that the parts to be inserted into the housing 1 can be introduced easily and, if required, also reached without difficulty, the housing 1 is equipped with a housing partition 17 extending in the longitudinal direction of the vehicle.

When the pivoting flap 9 is closed, a relatively high pressure builds up in front of the absorption filter 3 on the inflow side by the preceding blower 2, and the result of this can be that still unfiltered air passes outwards again along the housing partition 17. To prevent the leakage air from entering the passenger space 13 untreated, a respective partition segment 18 is also placed in front of the dashboard 16.

In addition to this external leakage point at the housing partition 17, there are also internal leakage points between the absorption filter 3 and the absorption filter holder 19 and at the closed pivoting flap 9. To prevent untreated air from overflowing into the passenger space 13 at these points, the absorption filter 3 and the pivoting flap 9 are each equipped with a continuous lip gasket 20, 21 respectively. The lip gasket 20 forms a first hollow chamber 23 by bearing against the absorption filter holder 19 as an associated bearing surface 22, according to FIG. 2, and the lip gasket 21 forms a second hollow chamber 25 by bearing against a bearing surface 24 connected in one bearing against a bearing surface 24 connected in one piece to the absorption filter holder 19 and sealed off from the housing 1.

In order, at the same time, always to guarantee a stable hollow chamber design, the lip gasket 20 and/or 21 can be stiffened on the fastening side by ribs 26 transverse relative to its direction of extension, as indicated on the lip gasket 21 in FIG. 2. The untreated leakage air collecting in the hollow chambers 23 and 25 is conveyed by a line 27 connecting the two hollow chamber 23 and 25 and then passing through the partition segment 18, to a location 28 which has a pressure level lower in relation to the flow off side of the absorption filter 3.

This lower pressure level at the location 28 is obtained by placing on the dashboard 16, on the same side as the equipment space, a cowl 29 which receives the fresh air inflow 7, and, when the blower 2 is in operation, air, through the fresh air inflow 7, and at the same time the leakage air escaping from the line 27 is sucked in and conveyed to the absorption filter 3.

Instead of the vacuum source provided by the blower 2, in a way not shown, the line 27 can also be guided to a suction pipe of an internal combustion engine or to a vacuum pump, these pressure sources then forming the location at which the pressure level is lower than the pressure level on the flow off side of the absorption filter 3.

If a change over is made to the circulating air mode in heavily contaminated air or when the air conditioning system is in operation, a flap 30 opens and the circulating air is conveyed to the blower 2 through a filter 31.

FIG. 3 shows a leakage air collecting arrangement which, on the same side as the pivoting flap, corresponds to the exemplary embodiment according to FIG. 2, but which has other sealing measure in the region of the absorption filter holder 19. These measures include two gaskets 31 and 32 which are assigned to the absorption filter 3, the gasket 31 being designed as an evacuable tubular gasket making the exchange of the filter easier. The two continuous gaskets 31 and 32 enclose a cavity 33 which is connected to the hollow chamber 25 and to the location at a low pressure level via the line 27.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Heating/air conditioning system for a motor vehicle comprising an exchangeable and selectively bypassable absorption filter which is arranged in a channel shaped housing having a shut off bypass line and through which at least one of fresh air and circulating air can flow, means for collecting unprocessed air passing through internal leakage points at an absorption filter holder and at the shut off bypass line means for conveying said collected unprocessed air via at least one line, to a location which is separated from a passenger space and has a pressure level lower than a pressure level on a flow off side of the absorption filter, and means for guiding untreated air which escapes through external leakage points of a housing partition located upstream of the absorption filter outside the passenger space, at the same time being prevented from overflowing into the passenger space.

2. Heating/air conditioning system according to claim 1, wherein the leakage air is collected in a region of at least one of the absorption filter holder and the shut off bypass line by at least one continuous lip gasket which is secured on at least one of a bearing side of the absorption filter and a pivoting flap of the shut off bypass line, the lip gasket and an associated bearing surface, forming a hollow chamber.

3. Heating/air conditioning system according to claim 2, wherein the lip gasket is stiffened on a fastening side by ribs positioned transverse relative to a direction of extension of the lip gasket.

4. Heating/air conditioning system according to claim 2, wherein the hollow chamber of more than one lip gasket are connected to one another.

5. Heating/air conditioning system according to claim 3, wherein the hollow chamber of more than one lip gasket are connected to one another.

6. Heating/air conditioning system according to claim 1, wherein the leakage air, in the region of the absorption filter holder, is collected, in a cavity which is limited by two continuous gaskets bracing the absorption filter relative to the absorption filter holder on inflow and flow off sides respectively.

7. Heating/air conditioning system according to claim 1, wherein the housing partition is located on a side of the dashboard facing away from the passenger space.

8. Heating/air conditioning system according to claim 1, wherein a blower is located in front of the channel shaped housing, and a cowl covering the housing partition and the blower is secured to the dashboard, thereby forming a location which is closed off, with the exception of a closable air inflow port, and has a reduced pressure level when the blower is in operation and into which the line opens.

9. Heating/air conditioning system according to claim 1, wherein the separated location, into which the line opens, is formed by a vacuum source.

10. Heating/air conditioning system according to claim 9, wherein the vacuum source is a suction pipe of an internal combustion engine.

* * * * *